(12) United States Patent
Ungerank et al.

(10) Patent No.: US 8,999,038 B2
(45) Date of Patent: Apr. 7, 2015

(54) PROCESS FOR SEPARATION OF GASES (75) Inventors: Markus Ungerank, Perg (AT); Goetz Baumgarten, Haltern am See (DE); Markus Priske, Duesseldorf (DE); Harald Roegl, Wallern an der Trattnach (AT)

(73) Assignee: Evonik Fibres GmbH, Schörfling am Attersee (AT)

( * ) Notice: Subject to any disclaimer, the term of this patent is extended or adjusted under 35 U.S.C. 154(b) by 0 days.

(21) Appl. No.: 13/807,831

(22) PCT Filed: May 26, 2011

(86) PCT No.: PCT/EP2011/058636
§ 371 (c)(1),
(2), (4) Date: Dec. 31, 2012

(87) PCT Pub. No.: WO2012/000727
PCT Pub. Date: Jan. 5, 2012

(65) Prior Publication Data
US 2013/0098242 A1 Apr. 25, 2013

(30) Foreign Application Priority Data
Jul. 1, 2010 (EP) .................... 10168121

(51) Int. Cl.
*B01D 53/22* (2006.01)
*C10L 3/10* (2006.01)

(52) U.S. Cl.
CPC ............ *B01D 53/225* (2013.01); *B01D 53/226* (2013.01); *B01D 53/227* (2013.01); *C10L 3/104* (2013.01); *B01D 2256/24* (2013.01); *B01D 2257/504* (2013.01); *Y02C 10/10* (2013.01)

(58) Field of Classification Search
USPC ............... 95/45, 47, 51, 55; 96/4, 7, 9, 10, 14
See application file for complete search history.

(56) References Cited

U.S. PATENT DOCUMENTS

| | | | |
|---|---|---|---|
| 5,591,250 | A | 1/1997 | Stern et al. |
| 5,919,285 | A | 7/1999 | Li et al. |
| 6,168,649 | B1 | 1/2001 | Jensvold et al. |
| 6,180,008 | B1 | 1/2001 | White |
| 6,425,267 | B1 * | 7/2002 | Baker et al. ............ 95/47 |
| 6,565,626 | B1 * | 5/2003 | Baker et al. ............ 95/51 |
| 6,648,944 | B1 * | 11/2003 | Baker et al. ............ 95/51 |
| 2004/0168570 | A1 * | 9/2004 | Franek .................... 95/50 |

(Continued)

FOREIGN PATENT DOCUMENTS

| | | |
|---|---|---|
| JP | 2009-242773 A | 10/2009 |
| WO | 00 06293 | 2/2000 |
| WO | 2011 009919 | 1/2011 |

OTHER PUBLICATIONS

Franz Borgmann, "Modellierung und Optimierung von Gaspermeationsanlagen", Diplomaufgabe, Jun. 20, 1990, 206 pages (with English-language translation).

(Continued)

*Primary Examiner* — Jason M Greene
(74) *Attorney, Agent, or Firm* — Oblon, McClelland, Maier & Neustadt, L.L.P.

(57) ABSTRACT

The invention relates to a specific apparatus, more particularly a chain of gas separation membrane modules, for separation of gas mixtures into two fractions each of elevated purity.

58 Claims, 5 Drawing Sheets

Illustrative connection arrangement of several membrane modules according to invention

(56) References Cited

U.S. PATENT DOCUMENTS

2006/0196355 A1* 9/2006 Ekiner et al. .................. 95/45
2011/0167821 A1* 7/2011 Baker et al. .................. 96/9

OTHER PUBLICATIONS

Baker, R., et al., "Natural Gas Processing with Membranes: An Overview," Industrial and Engineering Chemistry Research, vol. 47, No. 7, pp. 2109-2121, (Apr. 2, 2008) XP 002612501.

International Search Report Issued Sep. 20, 2011 in PCT/EP11/58636 Filed May 26, 2011.

Third Party Observation against corresponding European Patent Application No. 11722404.8-2113, dated Jun. 6, 2014.

Mathews J. Thundyil et al., "Effect of Permeate Pressure on the Mixed Gas Permeation of Carbon Dioxide and Methane in a Glassy Polyimide," *Journal of Membrane Science,* 152 (1999) pp. 29-40.

* cited by examiner

Fig. 1: Influence of the pressure ratio and of the selectivity on the separation outcome Fig. 2: One-stage membrane separation stage without recycling Fig. 3: One-stage membrane separation stage with recycling Fig. 4: Two-stage membrane separation stage with recompression and recycling Fig. 5: Staged arrangement for retentate and permeate with recompression and recycling in the second retentate stage upstream of the first retentate stage Fig. 6: Staged arrangement for retentate and permeate with recompression and recycling in the second retentate stage upstream of the second retentate stage Fig. 7: Staged arrangement for permeate with recompression Fig. 8: Staged arrangement for retentate with permeate recycling from the second stage and staged arrangement for permeate with recompression Fig. 9: Staged arrangement for retentate with permeate recycling from the second stage

Fig. 10: Connection arrangement with internal staged arrangement for permeate

Fig. 11: Illustrative connection arrangement of several membrane modules according to invention

PROCESS FOR SEPARATION OF GASES

The invention relates to a specific apparatus, more particularly a chain of gas separation membrane modules, for separation of gas mixtures into two fractions each of increased purity.

By means of a gas separation membrane, it is possible to separate gas mixtures on the basis of different permeabilities (=flow rate per unit time, unit area, pressure differential and layer thickness) of the individual gases in a polymer. The polymers are generally processed to give hollow fibers or flat membranes. The membranes are notable for a very thin separation layer at the surface of the membrane, such that the permeance (flow rate per unit time, unit area and pressure differential) of the membrane is at a maximum.

The separation outcome achievable with a membrane in a single pass depends not only on the selectivity of the membrane but also on the pressure ratio between high-pressure and low-pressure side of the membrane. The greater the pressure ratio, the better the maximum separation outcome achievable.

Figure 1:
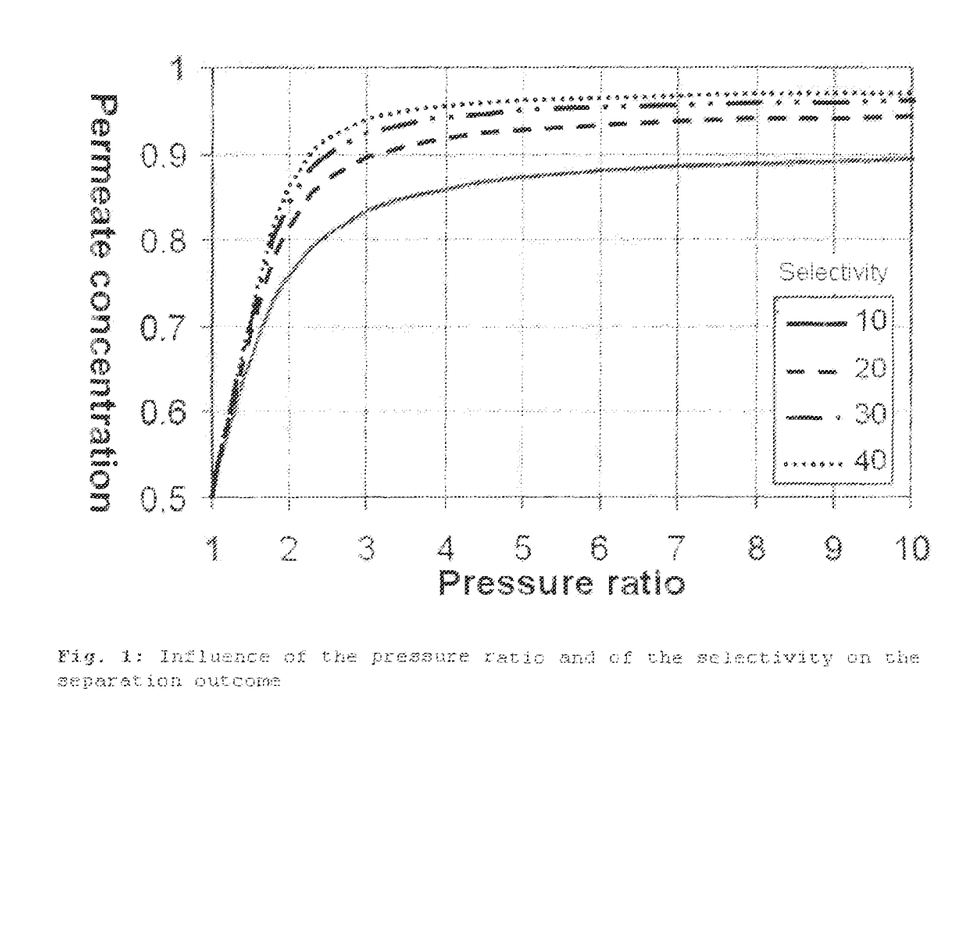
FIG. 1: Influence of the pressure ratio and of the selectivity on the separation outcome

In the range of low pressure ratios, the curves for the different selectivities run close to one another (see FIG. 1). The separation outcome in this range is determined by the pressure ratio. This range is therefore referred to as "pressure-limited". In the range of high pressure ratios, the separation outcome can barely be influenced by the pressure ratio. This range is referred to as "selectivity-limited".

Figure 2:
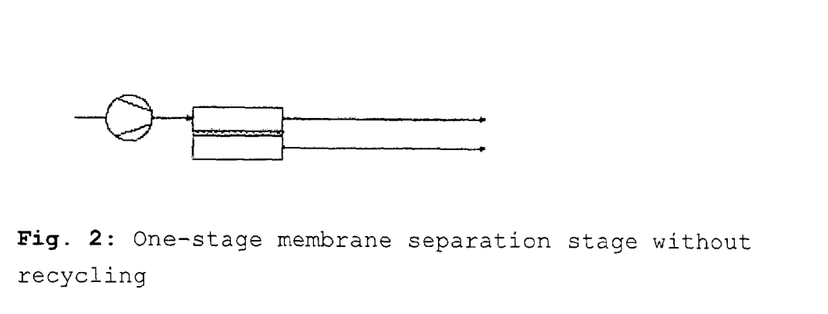
FIG. 2: One-stage membrane separation stage without recycling

A series of membrane connection arrangements for the separation of gases is known from the literature. In Baker, IndEngChemRes, Natural Gas Processing with Membranes, 47 (2008), there is a comprehensive list of various known connection arrangements. For instance, using the example of the separation of methane (retentate gas) and $CO_2$ (permeate gas) with a simple one-stage membrane separation step according to FIG. 2, high purities can be achieved in the product stream (98% $CH_4$). However, the quality of the permeate-side offgas stream cannot be influenced and is of low purity (44% $CO_2$). There is correspondingly large slippage, i.e. loss of methane.

Figure 3:
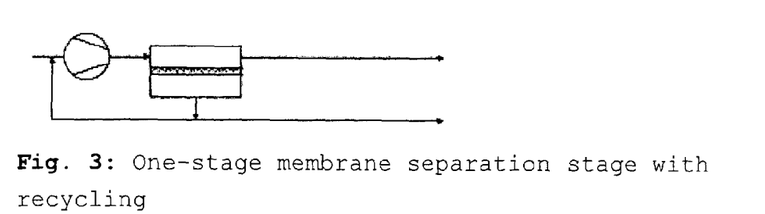
FIG. 3: One-stage membrane separation stage with recycling

In the case of a one-stage connection arrangement with recycling (FIG. 3), the purities can be increased slightly. However, it is not possible thereby to solve the fundamental problem of the low retentate gas yield and of the permeate gas quality.

Figure 4:
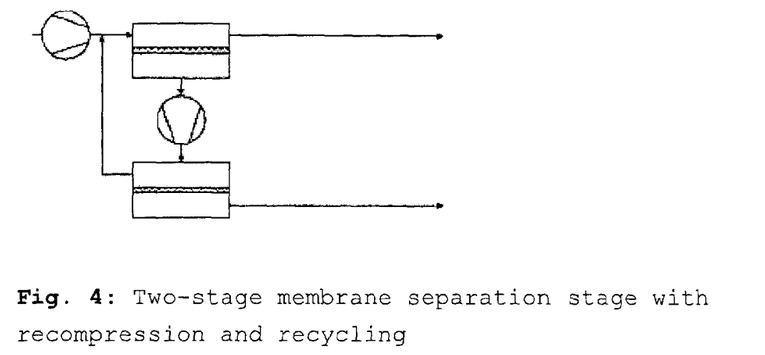
FIG. 4: Two-stage membrane separation stage with recompression and recycling

For higher permeate purities and higher yields of the component retained, a series of multistage connection arrangements are known. In a connection arrangement with a single permeate stage, with recompression and recycling of the first permeate (FIG. 4), it is possible to improve permeate purity (86%) and methane yield.

Figure 5:
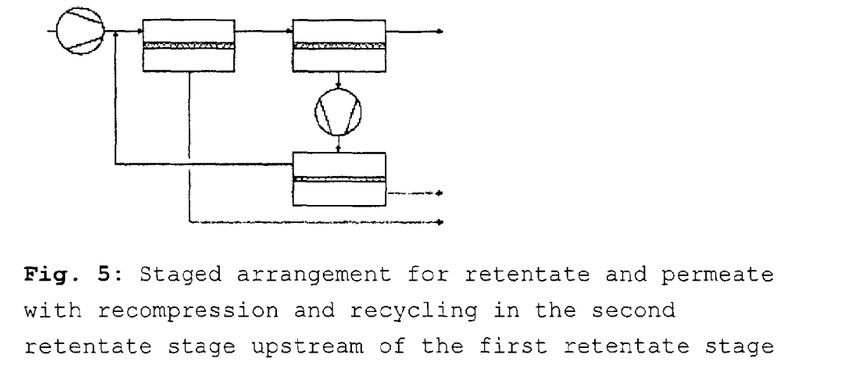
FIG. 5: Staged arrangement for retentate and permeate with recompression and recycling in the second retentate stage upstream of the first retentate stage

If the better-permeating component occurs in increased concentrations (30%), a connection arrangement according to FIG. 5 may be advantageous according to the literature. Two permeate gas-rich streams (82% $CO_2$, 93% $CO_2$) and one retentate gas-rich stream (82% $CH_4$) are produced.

Figure 6:
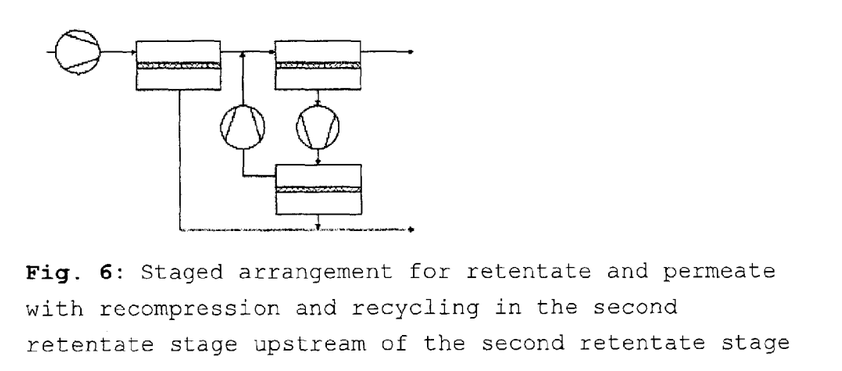
FIG. 6: Staged arrangement for retentate and permeate with recompression and recycling in the second retentate stage upstream of the second retentate stage

Bhide (MemSci, Hybrid processes for the removal of acid gases from natural gas, 1998) discloses a three-stage operation for the removal of acid gases from natural gas (FIG. 6). The gas stream to be treated is subjected to a coarse purification in an upstream membrane. The prepurified natural gas which remains on the pressure side is conducted through a further membrane. On the retentate side, the target product stream forms, the natural gas depleted of the acid gases. The acid gas-enriched stream on the permeate side is compressed and supplied to a further membrane stage. The retentate of this stage is compressed to the pressure level of the upstream stage and recirculated upstream thereof. This additional energy expenditure and financial investment is intended to increase the yield of methane. Disadvantages of this connection arrangement are the expenditures for the compressors and the inadequate purities of the acid gas-enriched stream.

Figure 7:
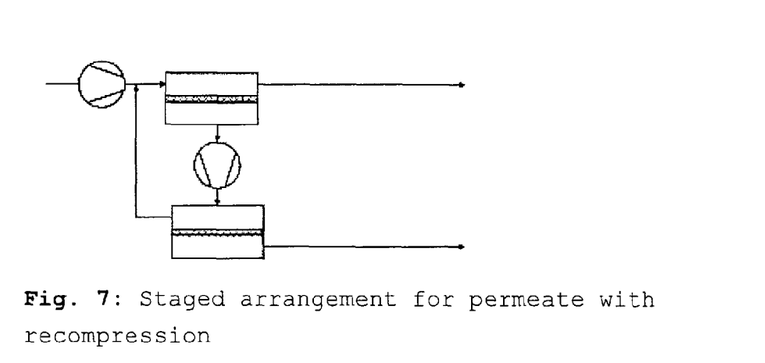
FIG. 7: Staged arrangement for permeate with recompression

Chenar (MemSci Application of Cardo-type polyimide (PI) and polyphenylene oxide (PPO) hollow, 2008) describes an operation with staged arrangement for permeate with recompression (FIG. 7). Disadvantages of this connection arrangement are the severely limited purities of the retentate gas and the additional expenditure for the recompression.

Figure 8:
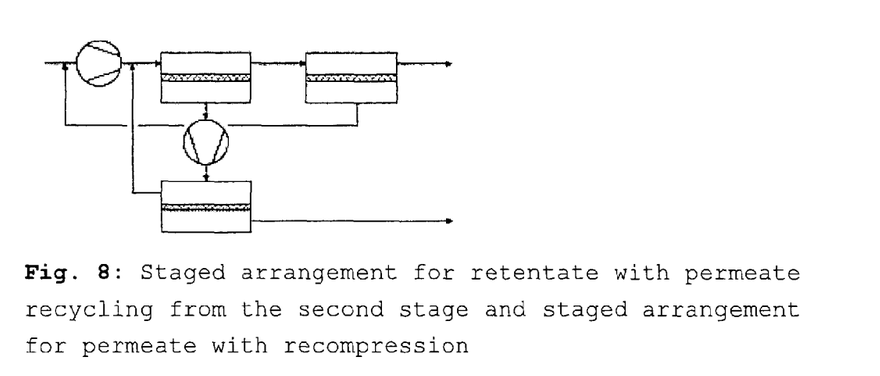
FIG. 8: Staged arrangement for retentate with permeate recycling from the second stage and staged arrangement for permeate with recompression

EP0 799 634 discloses a connection arrangement according to FIG. 8. However, disadvantages are an additional potential introduction of oil or water as a sealant and lubricant, additional high capital costs, increased energy consumption resulting from additional compression, and increased likelihood of failure as a result of the moving parts.

Disadvantages of the abovementioned processes are the additional recompression and the purities, which are still much too low, of retentate gas in the overall retentate stream, and the insufficient yields of the retentate gas in the retentate stream.

Figure 9:
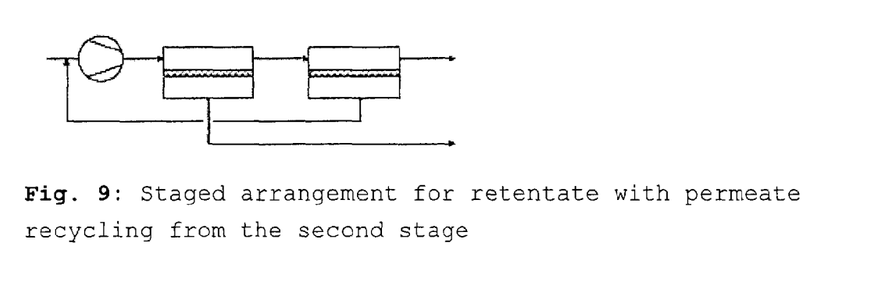
FIG. 9: Staged arrangement for retentate with permeate recycling from the second stage

FIG. 9 shows a technology which is frequently proposed and has also been implemented particularly for the processing of biogas (Air Liquide and Harasek). What is disclosed is a connection arrangement with staged arrangement for retentate with permeate recycling from the second stage.

Figure 10:
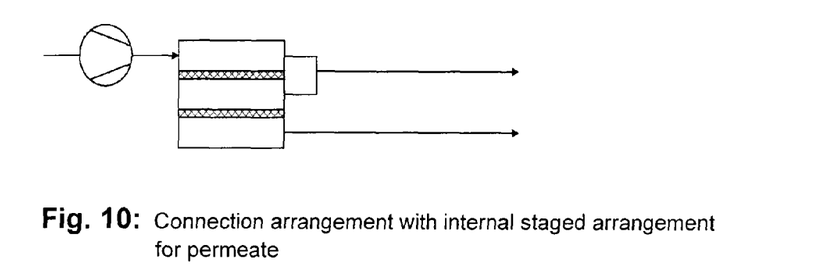
FIG. 10: Connection arrangement with internal staged arrangement for permeate

Eindhoven University of Technology has developed a connection arrangement with an internal staged arrangement, which enables methane purities of more than 90% (see FIG. 10). A disadvantage of this connection arrangement is the inadequate purity of the retentate gas.

EP 0 603 798 discloses a multistage connection arrangement for production of nitrogen. The disadvantage of this process is the insufficient purity of the permeating component and the use of at least two compressors.

EP0695574 discloses a connection arrangement with partial utilization of a permeate stream as a sweep stream for the production of a retentate of maximum purity. A disadvantage of this process is the insufficient quality of the overall permeate.

U.S. Pat. No. 5,753,011 discloses a process in which combination of membrane separation steps with staged arrangement for the permeate and pressure swing adsorption, PSA, achieves high purities for two product streams. A disadvantage of this process is the use of a costly and inconvenient PSA.

EP1634946 discloses a process for processing of biogas. Described therein is a thermal utilization of the methane from the methane-depleted stream. Disadvantages are the high costs and the loss of the gas.

EP0596268, finally, discloses various connection arrangements for production of three different gas compositions.

U.S. Pat. No. 6,565,626 B1 and U.S. Pat. No. 6,168,649 B1 each disclose membrane separation processes with three membrane separation stages, wherein a retentate stream and a permeate stream from stages 2 and 3 respectively are recycled to the crude gas stream.

A disadvantage of the processes known from the prior art is that either a high purity of the permeate gas or a high purity of the retentate gas can be achieved. For the simultaneous achievement of high purities of permeate gas and retentate gas, as necessary, for example, in the processing and feeding of biogas into the natural gas grid as a result of the high demands on the methane purity and as a result of the limitation of methane slippage, there are no processes which do not need a recompression unit or a further purification of the permeate or retentate stream (for example thermal postcombustion of the permeate stream or pressure swing adsorption for the retentate stream).

Proceeding from this prior art, it was an object of the present invention to provide apparatuses and processes for separation and purification of gas mixtures, which have the disadvantages of the prior art processes and apparatuses only to a reduced degree, if at all. More particularly, processes and apparatuses which afford both permeate gas and retentate gas are to be provided in high purities. In a further specific object, this process and this apparatus are to be advantageous in terms of investment and operating costs and/or enable a simpler process regime.

In a next specific object, a process/apparatus usable with maximum universality is to be provided for any desired gas mixtures. More particularly, it should be possible to separate gas streams which are obtained in the production of biogas and natural gas, or which comprise carbon dioxide and methane in the presence of other gases such as water, hydrogen, hydrogen sulfide.

It was a further specific object of the present invention to provide a process or an apparatus which enables purification of methane-containing crude gas streams, with reduced methane emission compared to the prior art processes at the same throughput, and hence reduced environment pollution by this strong greenhouse gas.

Further objects which are not stated explicitly are evident from the overall context of the claims, description, examples and figures which follow.

It has now been found that, surprisingly, the apparatus according to claim 1 or one of the claims dependent thereon can afford pure streams of permeate and retentate without requiring more than one compressor or any need to purify the permeate or retentate stream further by other methods. The inventive apparatus thus enables simultaneous achievement of permeate and retentate streams in high purity. The capital costs for the plant are low; it does not need any additional downstream purification processes. It was thus possible to achieve the stated objects with a pure membrane separation process.

Figure 11:
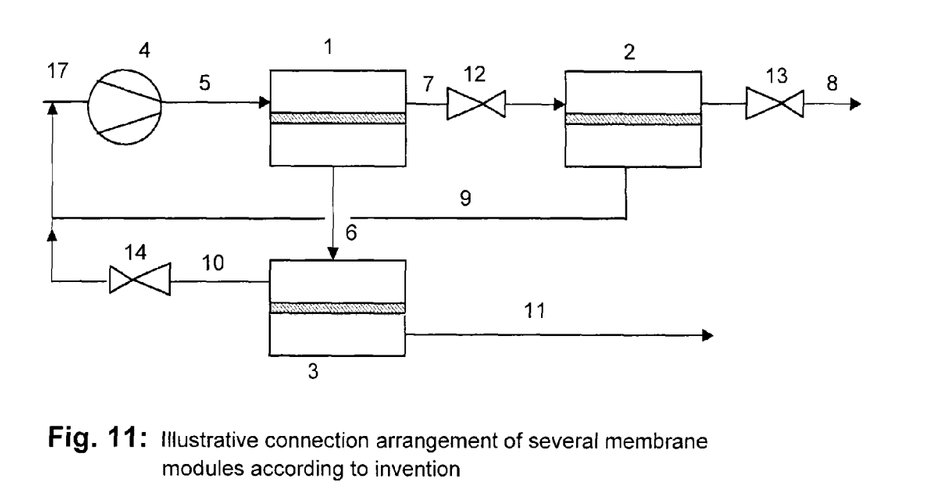
FIG. 11: Illustrative connection arrangement of several membrane modules according to invention

The present claims therefore provide the apparatus and process claimed in claims 1 to 12 and 13 to 18 respectively, and defined in detail in the description, examples and FIG. 11.

The present invention is described in detail hereinafter. First, some important terms are defined.

The quotient of the permeances of the individual gases gives the selectivity of the membrane for separation with regard to the two gases, and thus states how well the membrane can separate a gas mixture with regard to the two components. Permeate refers to the overall stream obtained on the low-pressure side of the membrane, membrane module or membrane separation step.

Permeate gas refers in each case to the component(s) enriched in each case in the permeate stream relative to the respective input stream at the membrane, at the membrane module or in the membrane separation step.

Retentate refers to the entire stream which is obtained on the high-pressure side of the membrane, membrane modules or membrane separation step and does not pass through the membrane.

Retentate gas refers to the component(s) enriched in each case in the retentate stream relative to the respective input stream at the membrane, at the membrane module or in the membrane separation step.

Crude gas or crude gas mixture or crude gas stream (17) refers to a gas mixture of at least two gases or a stream of this gas mixture which is to be separated by means of the process according to the invention or the inventive apparatus.

Feed stream (5) refers to a gas stream which is supplied to the feed stream separation stage (1). This stream, for the performance of the process, may correspond to the crude gas stream (17) or to the crude gas stream compressed by a compressor. After recycling of the second permeate stream (9) or of the third retentate stream (10), the feed stream (5) is composed of the gases of the crude gas stream (17), of the second permeate stream (9) and of the third retentate stream (10). The feed stream (5) can be produced either by mixing streams (9) and (10) both with the uncompressed crude gas stream (17), or mixing both with the compressed crude gas stream or mixing one with the uncompressed crude gas stream and one with the compressed crude gas stream, or by mixing streams (9) and/or (10) with the crude gas stream (17) in the compressor. Combinations of the variants described above are also encompassed by the present invention.

Feed stream separation stage (1) refers to a membrane separation stage for separation of the feed stream (5) into a first permeate stream (6) and a first retentate stream (7).

Retentate separation stage (2) refers to a membrane separation stage, which may be of identical or different construction to the feed stream separation stage (1), for separation of the first retentate stream (7) into a second permeate stream (9) and a second retentate stream (8).

Permeate separation stage (3) refers to a membrane separation stage, which may be of identical or different construction to the feed stream separation stage (1) and retentate separation stage (2), for separation of the first permeate stream (6) into a third permeate stream (11) and a third retentate stream (10).

The descriptions which follow of preferred and specific embodiments of the process according to the invention and the preferred and particularly suitable executions and the drawings and descriptions of the drawings illustrate the invention in detail merely by way of example, which means that it is not restricted to these execution and use examples or to the respective combinations of features within individual execution examples.

Individual features which are specified and/or described in connection with specific execution examples are not restricted to these execution examples or the combination with the other features of these execution examples; instead, they can be combined, within the range of technical possibilities, with any other variants, even if they are not discussed specifically in the present documents.

Identical reference symbols in the individual figures and diagrams of the drawings refer to identical or similar or identically or similarly acting components. The diagrams in the drawing also make clear those features which are not provided with reference numerals, irrespective of whether such features are described hereinafter or not. On the other hand, features which are included in the present description but are not visible or represented in the drawing are also immediately understandable to a person skilled in the art.

The inventive apparatus (see, for example, FIG. 11) comprises a chain of three membrane separation stages. Each stage consists of one or more physical gas separation modules, which are connected in parallel and/or in series within one stage. The driving force produced for the gas separation in the modules is a partial pressure differential between the retentate side and the permeate side in the respective membrane separation stages. The partial pressure differential can be generated either by means of a compressor (4) arranged on the feed side of the feed stream separation stage (1) and/or by means of at least one, preferably one or two, vacuum pump(s)

(not shown in FIG. 11), preferably in the second permeate stream (9) on the permeate side of the retentate separation stage (2) and/or in the third permeate stream (11) on the permeate side permeate separation stage (3). It may optionally be advantageous, in one or more of the membrane separation stages, to generate or to enhance the partial pressure difference by means of a permeate-side purge gas stream.

In a preferred configuration of the present invention, a compressor (4) brings the crude gas mixture or the gas mixture of the crude gas stream (17) and the second permeate stream (9) and/or the third retentate stream (10) to the desired pressure in the range from 5 to 100 bar, but preferably to a pressure of 9 to 75 bar. The resulting feed stream (5) is introduced into the feed stream separation stage (1). In the feed stream separation stage (1), a preseparation of the crude gas mixture into more easily permeating components (permeate gas), which pass mainly into the permeate of the first stage, and components which permeate less quickly (retentate gas), which are predominantly retained by the membrane and are enriched in the retentate, is obtained.

The process according to the invention or the inventive apparatus is notable in that it is configured such that the concentration of at least one permeate gas of the feed stream separation stage (1), after recycling of the second permeate stream (9) and of the third retentate stream (10), is increased in the feed stream (5), preferably by at least 2%, more preferably by at least 3% and most preferably by 3 to 40%, in each case compared to the concentration in the crude gas stream (17). The increase may depend on the composition of the crude gas stream (17) and is particularly marked in the case of low concentrations of a permeate gas (10 to 20%). In general, the increase in concentration of one of the permeate gases is between 2 and 15%, more preferably between 3 and 8%, when the content of the permeate gas in the crude gas stream (17) is between 30 and 70%. This is because the inventors have found that the yield of retentate gas in the overall process increases and hence the loss of retentate gas decreases when the concentration of the permeate gas in the feed stream separation stage (1) is increased. At the same cut in the separation stage (=ratio of permeate stream to feed stream in the stage in question), much less permeate gas passes into the permeate of the feed stream separation stage (1) when the concentration of at least one component A which permeates relatively easily in the feed stream separation stage (1) or of a permeate gas (A) is increased in feed stream (5). Analogously, a lowering was found when the concentration of component A or of a permeate gas A in the feed stream (5) to be purified is reduced. For instance, the cut in the separation stage for a concentration of 50% of a component A or of a permeate gas A in the feed stream (5) to be purified is between and 60%, preferably between 15 and 55% and more preferably between 20 and 50%. In a particularly preferred embodiment of the present invention, the process according to the invention or the inventive apparatus is therefore configured such that the content of permeate gas(es) of the feed stream separation stage (1) in feed stream (5) is greater than or equal to 40% by volume, preferably more than 50% by volume and very particularly more than 55% by volume, based on the volume of the feed stream (5), after recycling of the second permeate stream (9) and of the third retentate stream (10).

This increase in concentration of the permeate gases in the feed stream (5), as already explained, increases the efficiency of the feed stream separation stage (1), which in turn has the result that less retentate gas B passes into the first permeate stream (6). This in turn increases the efficiency of the permeate separation stage (3) and ensures that less unwanted retentate gas passes into the third permeate stream (10) here too.

Especially in the case of separation of methane-containing crude gases, this leads to the advantage that the unwanted emissions of methane, which is harmful to the climate, were reduced significantly.

In general, it can be stated that, in the feed stream separation stage (1), preferably 20 to 100%, more preferably 40 to 70%, of component A or of a permeate gas A are transferred from the feed stream (5) to the permeate.

The retentate of the feed stream separation stage (1), optionally with pressure reduction by an optionally present pressure-reducing valve (12), or with a pressure increase, is supplied by means of the first retentate stream (7) to the retentate separation stage (2) in which the fine purification is effected. On the retentate side of the retentate separation stage (2), i.e. in the second retentate stream (8), there is preferably a pressure-reducing valve (13), by means of which the pressure in the system can be maintained and kept constant. The content of the less easily permeating components or of a retentate gas B is increased further in the retentate separation stage (2), such that the content of component B or of a retentate gas B in the second retentate stream (8) is more than 90%, preferably more than 95% and more preferably more than 97%. In a particularly preferred variant, the process according to the invention or the inventive apparatus is thus notable in that at least 95%, preferably at least 97%, more preferably at least 99% and most preferably at least 99.5% of the retentate component of the feed stream separation stage (1) which has been introduced into the apparatus with the crude gas stream (17) is discharged via the second retentate stream (8).

The cut in the separation stage of retentate separation stage (2), at a concentration of component A or of a permeate gas A of 50% in the first retentate stream (7), is between 10 and 60%, preferably between 20 and 50%.

The permeate of the retentate separation stage (2) is recycled by means of the second permeate stream (9), supplied to the feed stream (5) and reprocessed. This can, as already explained above in the definition of the term "feed stream", be effected in different ways according to whether a compressor (4) or even a multistage compressor (4) is used. In the case of a one-stage compressor (4), the second permeate stream (9) is preferably supplied to the suction side of the compressor (4) (see FIG. 11). If a multistage compressor is used, it is preferable that the second permeate stream (9) is introduced into the compressor between two compression stages.

The permeate of the feed stream separation stage (1) which has been greatly enriched with component A or a permeate gas A is supplied by means of the first permeate stream (6) to the permeate separation stage (3). If necessary, it is possible by means of a pressure-reducing valve (14) in the retentate stream of the permeate separation stage (3), i.e. the third retentate stream (10), to prevent the pressure of the permeate of the feed stream separation stage (1) from declining to ambient pressure (see FIG. 11). In this way, the driving force for the permeate separation stage (3) can be maintained. The permeate separation stage (3) produces a permeate with a content of component B or of a retentate gas B of greater than 95%, preferably greater than 97% and more preferably greater than 99%, which is discharged from the apparatus via the third permeate stream (11). In a particularly preferred embodiment, the inventive apparatus is configured such that not more than 5%, preferably not more than 3%, more preferably not more than 1% and most preferably not more than 0.5% of the retentate component of the feed stream separation stage (1) introduced into the apparatus with the crude gas stream (17) is discharged via the third permeate stream (11).

The cut in the separation stage of the permeate separation stage (3) is between 50 and 95%, preferably between 70 and 93%.

The third retentate stream (10) is recycled, supplied to the feed stream (5) and reprocessed. This can, as already explained above, be effected in different ways and may depend, for example, on whether a compressor (4) or even a multistage compressor (4) is used. In the case of a one-stage compressor (4), the third retentate stream (10) is preferably supplied to the suction side of the compressor (4) (see FIG. 11). If a multistage compressor is used, it is preferable that the third retentate stream (10) is introduced into the compressor between two compression stages. In a preferred embodiment the retentate of the permeate separation stage (3) is recycled without total decompression into an elevated compression stage of the compressor (4) and/or the permeate of the second stage is recycled into an elevated compression stage of the compressor (4).

The process according to the invention or the inventive apparatus is notable particularly in that it is configured such that the gas volume recycled in the second permeate stream (9) and in the third retentate stream (10) totals less than 60% by volume, preferably to 50% by volume, most preferably 20 to 40% by volume, of the volume of the crude gas stream (17). The control of the amount of the retentate gas streams to be recycled can be controlled, for example, through selection of the respective membrane modules in the membrane separation stages (1) to (3) or by the pressures in the system or by the flows. The process according to the invention or the apparatus is thus notable in that, in spite of very low return streams, the increase in the concentration of the permeate component in the feed stream (5), which has been explained in detail above, is ensured. This distinctly increases the efficiency of the overall process.

The first permeate stream (6) is preferably conducted such that the feed pressure of the permeate separation stage (3), preferably by means of a pressure-reducing valve (14) on the retentate side of the permeate separation stage (3), is between 1 and 30 bar, preferably between 2 and 20 bar and more preferably 3 and 10 bar.

As already explained, it is particularly advantageous when a multistage compressor (4) is used. This is because it is possible in this case to dispense with a complete decompression of the retentate of the permeate separation stage (3), since the retentate of the permeate separation stage (3) can be fed in between two compressor stages of the compressor (4).

Since the retentate separation stage (2), in the case of decompression to feed pressure, would generally be operated in the selectivity-limited range, it may be advisable to decompress the second permeate stream (9) merely to a higher pressure level of a multistage pressure-increasing unit, i.e. of a multistage compressor (4), since this reduces the operating costs for the compression unit without distinctly worsening the separation outcome. In a particularly preferred embodiment of the present invention, therefore, a multistage compressor (4) is used and the gas streams (9) and (10) are supplied to this compressor in each case between two compression stages.

As already mentioned, the inventive apparatus may comprise one or more pressure-reducing valves (12), (13) or (14). In a preferred embodiment, preferably by means of a pressure-reducing valve (14), it is ensured that the pressure drop over the feed stream separation stage (1) is restricted to 1 and 30 bar, preferably between 2 and 20 bar and more preferably between 3 and 10 bar. Simultaneously or alternatively, preferably by means of a pressure-reducing valve (13), it is ensured that the pressure drop over the feed stream separation stage (1) and the retentate separation stage (2), is restricted to 1 and 100 bar, preferably between 5 and 80 bar and more preferably between 10 and 70 bar.

The inventive apparatus or the process according to the invention can in principle be implemented with all membranes which are capable of separating binary gas mixtures or multigas mixtures. The membrane materials used are preferably but not exclusively polymers. Useful polymers in the separation-active layer are more preferably polyimides, polyamides, polysulfones, cellulose acetates and derivatives, polyphenylene oxides, polysiloxanes, polymers with intrinsic microporosity, mixed matrix membranes, facilitated transport membranes, polyethylene oxides, polypropylene oxides, carbon membranes or zeolites, or mixtures thereof.

Particularly preferred membranes comprise, as materials for the separation-active layer or as a material for the complete membrane, a polyimide of the general formula R is selected from the group consisting of x,y: mol fraction where 0<x<0.5 and 1>y>0.5.

Such membranes are obtainable from Evonik Fibres GmbH under the Polyimid P84 and Polyimid P84 HT names. A process for producing these preferred membranes is disclosed in WO 2011/009919 A1. All membranes disclosed in this publication can be used with preference in the process according to the invention. To avoid straightforward repetition, reference is hereby made completely to the content of this patent application. It has been found that these membranes can achieve the best separation outcomes.

The membranes are preferably used in the form of hollow fiber membranes and/or flat membranes. The membranes are assembled into modules, which are then used in the separation task. The modules used may be all gas separation modules known in the prior art, for example but not exclusively hollow fiber gas separation modules, spiral-wound gas separation modules, cushion gas separation modules or tube bundle gas separation modules.

According to the invention, the gas separation membrane modules have a mixed gas selectivity of components A and B (=ratio of stream A to stream B through the membrane) of at least 30, preferably at least 35, more preferably at least 40, even more preferably of at least 45 and especially preferably of at least 45 to 80. Membranes of higher selectivity have the advantage that the separation becomes more effective and less permeate has to be recycled from retentate separation stage (2), or less retentate from permeate separation stage (3). Thus, especially in the case of use of a one-stage compressor (4), it is necessary to compress less gas twice, which entails economic advantages in the operation of the plant. In the case of very selective membrane modules having a selectivity of 45, only approx. 35% of the gas introduced into the feed stream separation stage (1) as crude gas need be compressed twice; with a membrane module having a selectivity of only 10, it may be the case that the double compression is up to 300%. The figures of 35% and 300% are based on experiments in which a gas mixture with equimolar amounts of components A and B (=feed) was applied, with 98.5% component B present in the retentate gas of stage (2) and 99% of component B in the permeate stream of stage (3).

It is evident that the inventive operation can be conducted in a much more economically viable manner with more selective membranes, and the necessary size of the compressor and the energy required can be reduced.

The process according to the invention/the inventive apparatus has the particular advantages that it is a pure membrane process and does not need any additional purification of the permeate and/or retentate streams (11) or (8) for many applications. For example, in the case of purification of biogas or natural gas (=removal of carbon dioxide from methane), there is no longer any need for a pressure swing adsorption or amine scrubbing for fine purification of the retentate, and so it can be fed into the natural gas grid.

In addition, with the process according to the invention/the inventive apparatus, it is possible at the same time to produce a pure retentate stream (8) and a pure permeate stream (11) in the biogas and natural gas purification. It can therefore be released into the atmosphere without any great losses of methane and without any great impairment of the environment, without any need for further treatment of the gas by a catalytic postcombustion or utilization in a combined heat and power plant. There is therefore no need for investment in further plant parts, which leads to a more economically viable purification process for biogas and natural gas.

A further advantage is considered to be that the process according to the invention/the inventive apparatus needs a much lower level of apparatus complexity and energy expenditure than the known prior art processes.

Especially through the combination of the inventive features of mixed gas selectivity, control of the amount of the retentate streams recycled and increase in the permeate component in the feed stream (5), an apparatus or a process much superior to the prior art processes can be provided.

The inventive apparatus or the process according to the invention can especially be used for separation of gas mixtures comprising at least two gases, the gas mixture separated most preferably being a mixture of predominantly but not exclusively carbon dioxide and methane or predominantly but not exclusively hydrogen and methane or predominantly but not exclusively carbon monoxide and hydrogen or crude biogas or crude natural gas.

The examples which follow are intended to illustrate and describe the present invention in detail, but do not restrict it in any way.

In the examples which follow, it was shown that, according to inventive connection arrangement of the modules and application of particular pressures, it was possible to simultaneously produce methane with a purity of more than 96% and carbon dioxide with a purity of more than 97% from a mixture of carbon dioxide and methane in a ratio of 50 to 50.

COMPARATIVE EXAMPLE 1

Separation of a Mixture of Methane and Carbon Dioxide with a Mixing Ratio of 50 to 50 with a Moderately Selective Polyimide Membrane The FIG. 11 shown connection arrangement was used. Each stage consisted of a hollow fiber membrane module consisting of hollow polyimide fibers from UBE (NM B01 A type). 1.78 $m^3$/h of a crude gas mixture of 50% methane and 50% carbon dioxide, which corresponds approximately to a gas mixture of biogas, is introduced into a mixing chamber (not shown in FIG. 11) and then compressed to 25 bar together with recycled gas composed of gas streams (9) and (10). The gas which has been compressed and cooled to 20° C. is applied to the feed stream separation stage (1). The retentate of the feed stream separation stage (1) is subsequently passed via the first retentate stream (7) to the retentate separation stage (2). A reducing valve (13) on the retentate side of the retentate separation stage (2) is set to 18.2 bara and thus determines the driving force through the membrane of membrane separation stages (1) and (2). The retentate of the retentate separation stage (2) has a content of 98.5% methane and 1.5% carbon dioxide. 0.895 $m^3$/h of this mixture leaves retentate separation stage (2). The permeate of retentate separation stage (2) has a volume flow rate of 0.743 $m^3$/h with a methane content of 34.5% and a carbon dioxide content of 65.5%, and is recycled via the second permeate stream (9) into the mixing chamber and compressed again by the compressor (4).

The permeate of the feed stream separation stage (1) has a volume flow rate of 1.67 $m^3$/h with a carbon dioxide content of 91.0% and a methane content of 9.0%, and is passed via the first permeate stream (6) as feed into the permeate separation stage (3). The pressure drop over the membrane of stage (1) does not extend to ambient pressure, but is limited to 4.2 bara by a reducing valve (14) on the retentate side of the permeate separation stage (3). This gives a third permeate stream (11) from permeate separation stage (3) of 0.885 $m^3$/h with a composition of 99.0% carbon dioxide and only 1.0% methane. The third retentate stream (10) from the permeate separation stage (3) is 0.801 $m^3$/h with a composition of 17.9% methane and 82.1% carbon dioxide and is recycled into the mixing chamber and compressed again. The sum of recycled gas streams (9) and (10) is therefore 1.544 $m^3$/h or 86.7% based on the amount of gas to be separated supplied. Pure product streams are obtained with a relatively high double compression rate. The membranes used exhibit a moderate mixed gas selectivity for carbon dioxide over methane of 20.

EXAMPLE 1

Separation of a Mixture of Methane and Carbon Dioxide with a Mixing Ratio of 50 to 50 with a Highly Selective Polyimide Membrane The FIG. 11 shown connection arrangement was used. Each stage consisted of a hollow fiber membrane module consisting of highly selective hollow polyimide fibers with a separation area of about 5 m² per module. These hollow polyimide fibers were produced according to example 19 of Austrian patent application A1164/2009, except working with a precipitation bath temperature of 40° C. rather than 10° C. 1 m³/h of a crude gas mixture of 50% methane and 50% carbon dioxide, which corresponds approximately to a gas mixture of biogas, is introduced into a mixing chamber and then compressed to 25 bar together with recycled gas composed of gas streams (9) and (10). The gas which has been compressed and cooled to 20° C. is applied to the feed stream separation stage (1). The retentate of this stage is passed via the first retentate stream (7) to the retentate separation stage (2). A reducing valve (13) on the retentate side of the retentate separation stage (2) is set to 18.4 bara and thus determines the driving force through the membrane of membrane separation stages (1) and (2). The retentate of the retentate separation stage (2) has a content of 98.5% methane and 1.5% carbon dioxide. 0.503 m³/h of this mixture leaves retentate separation stage (2). The permeate of retentate separation stage (2) has a volume flow rate of 0.262 m³/h with a methane content of 24.6% and a carbon dioxide content of 75.4%, and is recycled via the second permeate stream (9) into the mixing chamber and compressed again by the compressor (4).

The permeate of the feed stream separation stage (1) has a volume flow rate of 0.547 m³/h with a carbon dioxide content of 92.4% and a methane content of 7.6%, and is passed via the first permeate stream (6) as feed into the permeate separation stage (3). The pressure drop over the membrane of stage (1) does not extend to ambient pressure, but is limited to 5.0 bara by a reducing valve (14) on the retentate side of the permeate separation stage (3). This gives a third permeate stream (11) from permeate separation stage (3) of 0.497 m³/h with a composition of 99.0% carbon dioxide and only 1.0% methane. The third retentate stream (10) from the permeate separation stage (3) is 0.050 m³/h. The sum of recycled gas streams (9) and (10) is therefore 0.312 m³/h or 31.2% based on the amount of gas to be separated supplied. Pure product streams are obtained with a moderate double compression rate. The membranes used exhibit a high mixed gas selectivity for carbon dioxide over methane of 45. The high selectivity of 45 compared to 20 in the comparative example therefore enables a more economically favorable process by a lower recompression of 31.2% rather than 86.7%.

EXAMPLE 2

Separation of a Mixture of Methane and Carbon Dioxide with a Mixing Ratio of 50 to 50 with a Highly Selective Polyimide Membrane with a Methane Content in the Permeate Stream of Less than 0.5%

In order to satisfy various legislators, it is necessary to minimize the methane loss into the atmosphere. The FIG. 11 shown connection arrangement was used to lower the concentration of methane in the third permeate stream (11) to below 0.5% by volume. Each stage consisted of a hollow fiber membrane module consisting of highly selective polyimide fibers with a separation area of about 5 m² per module. These hollow polyimide fibers were produced according to example 19 of Austrian patent application A1164/2009, except working with a precipitation bath temperature of 40° C. rather than 10° C. 1 m³/h of a crude gas mixture of 50% methane and 50% carbon dioxide, which corresponds approximately to a gas mixture of biogas, is introduced into a mixing chamber and then compressed to 25 bar together with recycled gas composed of gas streams (9) and (10). The gas which has been compressed and cooled to 20° C. is applied to the feed stream separation stage (1). The retentate of this stage is passed via the first retentate stream (7) to the retentate separation stage (2). A reducing valve (13) on the retentate side of the retentate separation stage (2) is set to 18.1 bara and thus determines the driving force through the membrane of membrane separation stages (1) and (2). The retentate of the retentate separation stage (2) has a content of 98.5% methane and 1.5% carbon dioxide. 0.505 m³/h of this mixtures leaves retentate separation stage (2). The permeate of retentate separation stage (2) has a volume flow rate of 0.244 m³/h with a methane content of 26.1% and a carbon dioxide content of 73.9%, and is recycled via the second permeate stream (9) into the mixing chamber and compressed again by the compressor (4).

The permeate of the feed stream separation stage (1) has a volume flow rate of 0.607 m³/h with a carbon dioxide content of 93.1% and a methane content of 6.9%, and is passed via the first permeate stream (6) as feed into the permeate separation stage (3). The pressure drop over the membrane of stage (1) does not extend to ambient pressure, but is limited to 4.4 bara by a reducing valve (14) on the retentate side of the permeate separation stage (3). This gives a third permeate stream (11) from permeate separation stage (3) of 0.495 m³/h with a composition of 99.5% carbon dioxide and only 0.5% methane. The third retentate stream (10) from the permeate separation stage (3) is 0.112 m³/h and has a composition of 35% methane and 65% carbon dioxide and is recycled into the mixing chamber and compressed again. The sum of recycled streams (9) and (10) is therefore 0.356 m³/h or 35.6% based on the amount of gas to be separated supplied. Pure product streams are obtained with a moderate double compression rate. The membranes used exhibit a high mixed gas selectivity for carbon dioxide over methane of 45.

EXAMPLE 3

Separation of a Mixture of Methane and Carbon Dioxide with a Mixing Ratio of 50 to 50 with a Highly Selective Polyimide Membrane with a Methane Content in the Permeate Stream of Less than 0.5% with the Aid of a Vacuum Pump for the Permeate of Stage 2

In order to satisfy various legislators, it is necessary to minimize the methane loss into the atmosphere. The FIG. 11 shown connection arrangement, supplemented with a vacuum pump not shown in FIG. 11, was used to lower the concentration of methane in the third permeate stream (11) to below 0.5% by volume. Each stage consisted of a hollow fiber membrane module consisting of highly selective hollow polyimide fibers with a separation area of about 5 m² per module. These hollow polyimide fibers were produced according to example 19 of Austrian patent application A1164/2009, except working with a precipitation bath temperature of 40° C. rather than 10° C. 1 m³/h of a crude gas mixture of 50% methane and 50% carbon dioxide, which corresponds approximately to a gas mixture of biogas, is introduced into a mixing chamber and then compressed to 25 bar together with recycled gas composed of gas streams (9) and (10). The gas which has been compressed and cooled to 20° C. is applied to the feed stream separation stage (1). The retentate of this stage is passed via the first retentate stream (7) to the retentate separation stage (2). A reducing valve (13) on the retentate side of the retentate separation stage (2) is set to 14.5 bara and thus determines the driving force through the membrane of membrane separation stages (1) and (2). The retentate of the retentate separation stage (2) has a content of 98.5% methane and 1.5% carbon dioxide. 0.505 m³/h of this mixture leaves retentate separation stage (2). The permeate of retentate separation stage (2) has a pressure of 0.2 bara, established by a vacuum pump, and has a volume flow rate of 0.371 m³/h with a methane content of 13.3% and a carbon dioxide content of 86.7%. The gas stream is recycled from the pressure side of the vacuum pump via the second permeate stream (9) into the mixing chamber and compressed again by the compressor (4).

The permeate of the feed stream separation stage (1) has a volume flow rate of 0.542 m³/h with a carbon dioxide content of 94.8% and a methane content of 5.2%, and is passed via the first permeate stream (6) as feed into the permeate separation stage (3). The pressure drop over the membrane of stage (1) does not extend to ambient pressure, but is limited to 4.4 bara by a reducing valve (14) on the retentate side of the permeate separation stage (3). This gives a third permeate stream (11) from permeate separation stage (3) of 0.495 m³/h with a composition of 99.5% carbon dioxide and only 0.5% methane. The third retentate stream (10) from the permeate separation stage (3) is 0.047 m³/h and has a composition of 54.9% methane and 45.1% carbon dioxide and is recycled into the mixing chamber and compressed again. The sum of recycled streams (9) and (10) is therefore 0.417 m³/h or 41.7% based on the amount of gas to be separated supplied. Pure product streams are obtained with a moderate double compression rate. The membranes used exhibit a high mixed gas selectivity for carbon dioxide over methane of 45. In contrast to the above example 2, less pressure is required (14.5 bar rather than 18.1 bar=80.1% of the pressure), and only 6.1% more double compression, which leads to a saving in compression work.

EXAMPLE 4

Separation of a Mixture of Methane and Carbon Dioxide with a Mixing Ratio of 50 to 50 with a Highly Selective Polyimide Membrane with a Methane Content in the Permeate Stream of Less than 0.5% with the Aid of a Vacuum Pump for the Permeate of Stage 2 and Improved Retentate Purity In order to satisfy various legislators, it is necessary to minimize the methane loss into the atmosphere.

The FIG. 11 shown connection arrangement, supplemented with a vacuum pump not shown in FIG. 11, was used to increase the concentration of methane in the second retentate stream (8). The vacuum improves the pressure ratio in the retentate separation stage (2) by reducing the pressure in the second permeate stream (9), such that the driving force is increased and higher purities can be achieved in the second retentate stream (8).

Each stage consisted of a with a separation area of about 5 m² per module. These hollow polyimide fibers were produced according to example 19 of Austrian patent application A1164/2009, except working with a precipitation bath temperature of 40° C. rather than 10° C. 1 m³/h of a crude gas mixture of 50% methane and 50% carbon dioxide, which corresponds approximately to a gas mixture of biogas, is introduced into a mixing chamber and then compressed to 25 bar together with recycled gas composed of gas streams (9) and (10). The gas which has been compressed and cooled to 20° C. is applied to the feed stream separation stage (1). The retentate of this stage is passed via the first retentate stream (7) to the retentate separation stage (2). A reducing valve (13) on the retentate side of the retentate separation stage (2) is set to 18.1 bara and thus determines the driving force through the membrane of membrane separation stages (1) and (2). The retentate of the retentate separation stage (2) has a content of 99.7% methane and 0.3% carbon dioxide. 0.499 m³/h of this mixture leaves retentate separation stage (2). The permeate of retentate separation stage (2) has a pressure of 0.2 bara, established by a vacuum pump, and has a volume flow rate of 0.258 m³/h with a methane content of 25.8% and a carbon dioxide content of 74.2%. The gas stream is recycled from the pressure side of the vacuum pump via the second permeate stream (9) into the mixing chamber and compressed again by the compressor (4).

The permeate of the feed stream separation stage (1) has a volume flow rate of 0.608 m³/h with a carbon dioxide content of 93.2% and a methane content of 6.8%, and is passed via the first permeate stream (6) as feed into the permeate separation stage (3). The pressure drop over the membrane of stage (1) does not extend to ambient pressure, but is limited to 4.4 bara by a reducing valve (14) on the retentate side of the permeate separation stage (3). This gives a third permeate stream (11) from permeate separation stage (3) of 0.501 m³/h with a composition of 99.5% carbon dioxide and only 0.5% methane. The third retentate stream (10) from the permeate separation stage (3) is 0.107 m³/h and has a composition of 36.2% methane and 63.8% carbon dioxide and is recycled into the mixing chamber and compressed again. The sum of recycled streams (9) and (10) is therefore 0.366 m³/h or 36.6% based on the amount of gas to be separated supplied. Pure product streams are obtained with a moderate double compression rate. The membranes used exhibit a high mixed gas selectivity for carbon dioxide over methane of 45. In contrast to the above example 3, use of a vacuum pump on the permeate side of the retentate separation stage (2) gives a much cleaner retentate with the same compressor output (99.7% methane rather than 98.5%).

LIST OF REFERENCE NUMERALS

1: Feed stream separation stage
2: Retentate separation stage
3: Permeate separation stage 3
4: One-stage or multistage compressor
5: Feed stream
6: First permeate stream
7: First retentate stream
8: Second retentate stream
9: Second permeate stream
10: Third retentate stream
11: Third permeate stream
12: Optional pressure-reducing valve in the first retentate stream 7
13: Optional pressure-reducing valve in the second retentate stream 8
14: Optional pressure-reducing valve in the third retentate stream 10
15: Vacuum pump (not reproduced in the FIGS.
16: Mixing chamber (not reproduced in the FIGS.
17: Crude gas stream

The invention claimed is:

1. An apparatus for separating gases, comprising:
membrane separation stages; and,
a compressor, a vacuum pump, or both,
wherein the membrane separation stages comprise a feed stream separation stage, a retentate separation stage, and a permeate separation stage:
the feed stream separation stage is configured to separate a feed stream comprising at least two components into a first permeate stream and a first retentate stream,
the retentate separation stage is configured to divide the first retentate stream into a second permeate stream and a second retentate stream,
wherein
the second permeate stream is supplied to the feed stream, and the second retentate stream is withdrawn as a product, and
the permeate separation stage is configured to divide the first permeate stream into a third retentate stream and a third permeate stream,
wherein
the third retentate stream is supplied to the feed stream, and the third permeate stream is withdrawn as a product,
the apparatus is configured not to subject the first permeate stream to any recompression,
the feed stream separation stage comprises a gas separation membrane module having a mixed gas selectivity of at least 30,
the apparatus is configured such that a gas volume recycled in the second permeate stream and in the third retentate stream totals less than 60% by volume of a crude gas stream,
the apparatus is configured to increase a concentration of at least one permeate gas of the feed stream separation stage, after recycling of the second permeate stream and of the third retentate stream, in the feed stream, compared to a concentration in the crude gas stream.

2. The apparatus of claim 1,
wherein
the apparatus is configured to pass the second permeate stream and the third retentate stream along a suction side of the compressor.

3. The apparatus of claim 1, comprising:
a multistage compressor as a compressor.

4. The apparatus of claim 3, wherein the apparatus is configured to introduce the second permeate stream, the third retentate stream, or both into the compressor between two compression stages.

5. The apparatus of claim 1, wherein the apparatus is configured to pass at least one selected from the group consisting of the first retentate stream, the second retentate stream, and the third retentate stream through a pressure-reducing valve.

6. The apparatus of claim 1, wherein the gas separation membrane module in at least one of the membrane separation stages has a mixed gas selectivity of at least 35.

7. The apparatus of claim 1, wherein at least one of the membrane separation stages comprises more than one gas separation membrane module, wherein the modules are connected in parallel, in series, or in parallel and in series.

8. The apparatus of claim 1, wherein at least one of the membrane separation stages comprises a gas separation membrane module comprising a hollow fiber membrane, a flat membrane, or both.

9. The apparatus of claim 1, wherein a separation-active layer of a membrane comprises a material that is an amorphous or semicrystalline polymer.

10. The apparatus of claim 1, wherein the apparatus is configured to discharge at least 95% of a retentate component of the feed stream separation stage which has been introduced into the apparatus with the crude gas stream via the second retentate stream.

11. The apparatus of claim 1, wherein the apparatus is configured to discharge not more than 5% of a retentate component of the feed stream separation stage introduced into the apparatus with the crude gas stream via the third permeate stream.

12. A process for separating a gas mixture stream comprising:
separating the gas mixture with an apparatus comprising:
membrane separation stages; and
a compressor, a vacuum pump, or both,
wherein the membrane separation stages comprise a feed stream separation stage, a retentate separation stage, and a permeate separation stage:
the feed stream separation stage is configured to separate the gas mixture stream into a first permeate stream and a first retentate stream,
the retentate separation stage is configured to divide the first retentate stream into a second permeate stream and a second retentate stream,
wherein the second permeate stream is supplied to the gas mixture stream, and the second retentate stream is withdrawn as a product, and the permeate separation stage is configured to divide the first permeate stream into a third retentate stream and a third permeate stream,
wherein the third retentate stream is supplied to the gas mixture stream, and
the third permeate stream is withdrawn as a product,
the apparatus is configured not to subject the first permeate stream to any recompression,
the feed stream separation stage comprises a gas separation membrane module having a mixed gas selectivity of at least 30, the apparatus is configured such that a gas volume recycled in the second permeate stream and in the third retentate stream totals less than 60% by volume of a crude gas stream, the apparatus is configured to increase a concentration of at least one permeate gas of the feed stream separation stage, after recycling of the second permeate stream and of the third retentate stream, in the feed stream, compared to a concentration in the crude gas stream, and wherein the third permeate stream comprises more than 95 vol % of a retentate gas of the feed stream separation stage in the gas mixture stream, and the second retentate system comprises more than 95 vol % of a permeate gas of the feed stream separation stage in the gas mixture stream.

13. The process of claim 12, wherein
the crude gas stream comprises:
at least one of
a crude biogas and
a crude natural gas.

14. The process of claim 12, wherein the separating comprises adjusting a pressure on a permeate side of the feed stream separation stage with a pressure-reducing valve on a retentate side of the permeate separation stage, to from 1 to 30 bar.

15. The process of claim 14, wherein the material is a polyimide of formula wherein
each R is independently selected from the group consisting of x and y are mol fractions,
0<x<0.5, and
1>y>0.5.

16. The process of claim 12, wherein the separating comprises adjusting a pressure of the first and second retentate stream with a pressure-reducing valve in the second retentate stream, to from 1 to 100 bar.

17. The process of claim 12, wherein a driving force is a partial pressure differential between a retentate side and a permeate side in the respective membrane separation stages, wherein the partial pressure differential is generated by at least one selected from the group consisting of a compressor in the feed stream, a vacuum pump in the second permeate stream, a vacuum pump in the third permeate stream, and a permeate-side purge gas stream.

18. The process of claim 17, wherein a pressure of the permeate side of the feed stream separation stage is greater than or equal to an ambient pressure,
the driving force comprises the ambient pressure or a reduce pressure at the permeate side of the permeate separation stage.

19. The apparatus of claim 1, wherein the material is at least one selected from the group consisting of a polyimide, a polyamide, a polysulfone, a cellulose acetate, a cellulose acetate derivative, a polyphenylene oxide, a polysiloxane, a polymer with an intrinsic microporosity, a mixed matrix membrane, a facilitated transport membrane, a polyethylene oxide, and a polypropylene oxide.

20. The process of claim 13, wherein the crude gas mixture consists essentially of carbon dioxide and methane.

21. The process of claim 12, wherein the third permeate stream comprises more than 97 vol % of the carbon dioxide in the gas mixture stream.

22. The process of claim 12, wherein the second retentate stream comprises more than 97 vol % of the methane in the gas mixture stream.

23. The process of claim 12, wherein the crude gas stream comprises carbon dioxide and methane.

24. The process of claim 12, wherein the crude gas stream comprises hydrogen and methane.

25. The process of claim 12, wherein the crude gas stream comprises carbon monoxide and hydrogen.

26. The process of claim 12, wherein the apparatus is configured to pass the second permeate stream and the third retentate stream along a suction side of the compressor.

27. The process of claim 12, wherein the compressor is a multistage compressor.

28. The process of claim 12, wherein the apparatus is configured to introduce the second permeate stream, the third retentate stream, or both into the multistage compressor between two compression stages.

29. The process of claim 12, wherein the apparatus is configured to pass at least one selected from the group consisting of the first retentate stream, the second retentate stream, and the third retentate stream through a pressure-reducing valve.

30. The process of claim 12, wherein the gas separation membrane module in at least one of the membrane separation stages having a mixed gas selectivity for carbon dioxide and methane of at least 35.

31. The process of claim 12, wherein at least one of the membrane separation stages comprises more than one gas separation membrane module, wherein the modules are connected in parallel, in series, or in parallel and in series.

32. The process of claim 12, wherein at least one of the membrane separation stages comprises a gas separation membrane module comprising a hollow fiber membrane, a flat membrane, or both.

33. The process of claim 12, wherein a separation-active layer of a membrane comprises a material that is an amorphous or semicrystalline polymer.

34. A process for separating a gas mixture stream comprising methane and carbon dioxide, comprising:
 separating the gas mixture with an apparatus comprising:
 membrane separation stages; and,
 a compressor, a vacuum pump, or both,
 wherein the membrane separation stages comprise a feed stream separation stage, a retentate separation stage, and a permeate separation stage:
 the feed stream separation stage is configured to separate a feed stream comprising at least two components into a first permeate stream and a first retentate stream,
 the retentate separation stage is configured to divide the first retentate stream into a second permeate stream and a second retentate stream,
  wherein the second permeate stream is supplied to the feed stream, and the second retentate stream is withdrawn as a product, and
 the permeate separation stage is configured to divide the first permeate stream into a third retentate stream and a third permeate stream,
  wherein the third retentate stream is supplied to the feed stream, and the third permeate stream is withdrawn as a product,
 the apparatus is configured not to subject the first permeate stream to any recompression,
 the feed stream separation stage comprises a gas separation membrane module having a mixed gas selectivity of at least 30,
 the apparatus is configured such that a gas volume recycled in the second permeate stream and in the third retentate stream totals less than 60% by volume of a crude gas stream,
 the apparatus is configured to increase a concentration of at least one permeate gas of the feed stream separation stage, after recycling of the second permeate stream and of the third retentate stream, in the feed stream, compared to a concentration in the crude gas stream.

35. The process of claim 34, wherein the material is at least one selected from the group consisting of a polyimide, a polyamide, a polysulfone, a cellulose acetate, a cellulose acetate derivative, a polyphenylene oxide, a polysiloxane, a polymer with an intrinsic microporosity, a mixed matrix membrane, a facilitated transport membrane, a polyethylene oxide, and a polypropylene oxide.

36. The process of claim 35, wherein the material is a polyimide of formula wherein each R is independently selected from the group consisting of x and y are mol fractions,
0<x<0.5, and
1>y>0.5.

37. The process of claim 34, wherein the crude gas stream comprises at least one gas pair selected from the group consisting of:
 carbon dioxide and methane;
 hydrogen and methane;
 carbon monoxide and hydrogen;
 a crude biogas; and
 a crude natural gas.

38. The process of claim 34, wherein the crude gas stream consists essentially of at least one gas pair selected from the group consisting of:
 carbon dioxide and methane;
 hydrogen and methane;
 carbon monoxide and hydrogen;
 a crude biogas; and
 a crude natural gas.

39. The process of claim 34, wherein the third permeate stream comprises less than 5 vol. % of the retentate gas compared to the amount of said retentate gas originally introduced into the process with crude gas stream and that the second retentate stream comprises more than 95 vol. % of the retentate gas of the feed stream separation stage compared to the amount of said retentate gas originally introduced into the process with the crude gas stream.

40. The process of claim 39, wherein a driving force is a partial pressure differential between a retentate side and a permeate side in the respective membrane separation stages, and wherein the partial pressure differential is generated by at least one selected from the group consisting of a compressor in the feed stream, a vacuum pump in the second permeate stream, a vacuum pump in the third permeate stream, and a permeate-side purge gas stream.

41. The process of claim 39, wherein a pressure of the permeate side of the feed stream separation stage is greater than or equal to an ambient pressure,
the driving force comprises the ambient pressure or a reduce pressure at the permeate side of the permeate separation stage.

42. The process of claim 39, wherein the material is at least one selected from the group consisting of a polyimide, a polyamide, a polysulfone, a cellulose acetate, a cellulose acetate derivative, a polyphenylene oxide, a polysiloxane, a polymer with an intrinsic microporosity, a mixed matrix membrane, a facilitated transport membrane, a polyethylene oxide, and a polypropylene oxide.

43. The process of claim 34, wherein the separating comprises adjusting a pressure of the first and second retentate stream with a pressure-reducing valve in the second retentate stream, to from 1 to 100 bar.

44. The process of claim 34, wherein the separating comprises adjusting a pressure on a permeate side of the feed stream separation stage with a pressure-reducing valve on a retentate side of the permeate separation stage, to from 1 to 30 bar.

45. The process of claim 34, wherein the gas separation membrane module in at least one of the membrane separation stages has a mixed gas selectivity of at least 35.

46. The process of claim 34, wherein the gas separation membrane module in at least one of the membrane separation stages has a mixed gas selectivity of at least 45.

47. The process of claim 34, wherein the apparatus comprises at least one gas separation membrane module comprising hollow polyimide fibers having a separation area of about 5 m$^2$.

48. The process of claim 34, wherein the apparatus is configured to pass the second permeate stream and the third retentate stream along a suction side of the compressor.

49. The process of claim 34, wherein the compressor is a multistage compressor.

50. The process of claim 34, wherein the apparatus is configured to introduce the second permeate stream, the third retentate stream, or both into the multistage compressor between two compression stages.

51. The process of claim 34, wherein the apparatus is configured to pass at least one selected from the group consisting of the first retentate stream, the second retentate stream, and the third retentate stream through a pressure-reducing valve.

52. The process of claim 34, wherein at least one of the membrane separation stages comprises more than one gas separation membrane module, wherein the modules are connected in parallel, in series, or in parallel and in series.

53. The process of claim 34, wherein at least one of the membrane separation stages comprises a gas separation membrane module comprising a hollow fiber membrane, a flat membrane, or both.

54. The process of claim 39, wherein a separation-active layer of a membrane comprises a material that is an amorphous or semicrystalline polymer.

55. The process of claim 39, wherein the material is a polyimide of formula wherein
each R is independently selected from the group consisting of x and y are mol fractions,
0<x<0.5, and
1>y>0.5.

56. The apparatus of claim 1, wherein the second retentate stream comprises more than 97 vol % of the methane in the gas mixture stream.

57. The apparatus of claim 1, wherein the apparatus comprises at least one gas separation membrane module having a gas selectivity for methane and carbon dioxide of at least 45.

58. The apparatus of claim 1, wherein the apparatus comprises at least one gas separation membrane module comprising hollow polyimide fibers having a separation area of about 5 m$^2$.

* * * * *